(12) United States Patent
Hidaka (10) Patent No.: US 7,145,764 B2
(45) Date of Patent: Dec. 5, 2006

(54) CONSOLE UNIT AND OPERATION BUTTON UNIT

(75) Inventor: Hiroshi Hidaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 243 days.

(21) Appl. No.: 10/780,578

(22) Filed: Feb. 19, 2004

(65) Prior Publication Data

US 2005/0007729 A1   Jan. 13, 2005

(30) Foreign Application Priority Data

Jul. 9, 2003   (JP) ............... 2003-272540

(51) Int. Cl.
*H05K 7/20* (2006.01)
*G11B 15/04* (2006.01)

(52) U.S. Cl. ............... 361/679; 720/652; 91/486

(58) Field of Classification Search ........ 361/679–687, 361/724–727; 482/54; 720/652; 91/486
See application file for complete search history.

(56) References Cited

U.S. PATENT DOCUMENTS 3,768,377 A * 10/1973 Engel et al. ............... 91/486

2004/0018918 A1 * 1/2004 Reyes et al. ............... 482/54
2005/0097583 A1 * 5/2005 Okumura .................. 720/652

FOREIGN PATENT DOCUMENTS

JP   2000-174447   6/2000
JP   2002-75114    3/2002

* cited by examiner

*Primary Examiner*—Hung Van Duong
(74) *Attorney, Agent, or Firm*—Staas & Halsey LLP (57) ABSTRACT

A console unit includes a substrate extending along a virtual plane. A support extends rearward from the front end. The substrate is received on the support. A console is connected to the front end of the support for relative rotation around a rotation axis intersecting the virtual plane. The console is allowed to occupy a larger space even if the substrate is reduced in size. The visibility of the console cannot be degraded irrespective of a reduced size of the substrate. Other components may be positioned adjacent the console unit. Replacement of the component is often required without detaching the console. The console is allowed to retreat from the path of movement of the component based on the rotational movement. Interference can reliably be prevented between the console unit and the other component during replacement of the other component.

15 Claims, 7 Drawing Sheets

CONSOLE UNIT AND OPERATION BUTTON UNIT

BACKGROUND OF THE INVENTION

1. Field of the Invention

The present invention relates to an electronic apparatus such as a disk array unit or apparatus of the rack mount type. In particular, the invention relates to a console unit and/or an operation button assembly attached to the electronic apparatus.

2. Description of the Prior Art

In general, a so-called back panel is disposed within an enclosure in a disk array apparatus. A power source unit, a controller unit, a battery unit, a console unit and hard disk drive (HDD) units are inserted into the enclosure through an opening. The individual units are provided with connectors to be received on connectors fixed on the back panel. Electric connections can be established between the units in this manner.

The disk array apparatus is required to always keep operating. The console unit cannot be detached from the disk array apparatus. On the other hand, replacement of the battery unit and/or the HDD unit should be allowed irrespective of the continuous operation of the disk array unit. It is preferable to enable replacement of the battery unit and/or the HDD unit without interference with the undetachable console unit. Even in this case, enlargement of the size of the disk array apparatus should be avoided.

SUMMARY OF THE INVENTION

It is accordingly an object of the present invention to provide a console unit greatly contributing to reduction in the size of an electronic apparatus such as a disk array apparatus. It is also an object of the present invention to provide an operation button unit and/or an operation button assembly greatly contributing to reduction in the size of an electronic apparatus.

According to a first aspect of the present invention, there is provided a console unit comprising: a substrate extending along a virtual plane; a support member extending rearward from the front end and defining a surface receiving the substrate; and a console connected to the front end of the support member for relative rotation around a rotation axis intersecting the virtual plane. The console is electrically connected to the substrate.

The console unit of this type ensures a sufficient size of the console irrespective of the size of the substrate. In other words, the console is allowed to occupy a larger space even if the substrate is reduced in size. The visibility of the console cannot be degraded irrespective of a reduced size of the substrate. The manual operation to the console cannot be degraded irrespective of a reduced size of the substrate.

In general, the console unit may be incorporated within an electronic apparatus. The electronic apparatus is often required to keep operating without any interruption. In this situation, the console unit cannot be detached from the electronic apparatus. On the other hand, other components or units may be positioned adjacent the console unit in the electronic apparatus. Replacement of the component or unit is often required during the continuous operation of the electronic apparatus. The console is allowed to retreat from the path of movement of the component or unit based on the rotational movement. Accordingly, interference can reliably be prevented between the console unit and the other component or unit during replacement of the other component or unit.

In this case, an electronic apparatus may comprise: an enclosure; a substrate extending along a virtual plane within the enclosure; a support member extending rearward from the front end connected to the enclosure, the support member defining a surface receiving the substrate; and a console connected to the front end of the support member for relative rotation around a rotation axis intersecting the virtual plane, the console being electrically connected to the substrate. A connector may be attached to the rear end of the support member. The connector may protrude rearward from the rear end of the support member along the virtual plane. The connector may be mounted on the substrate. In addition, the electronic apparatus may further include a connection board disposed in the enclosure in an attitude intersecting the virtual plane. The connector can be connected to a connector located on the connection board. The console unit is thus electrically connected to the connection board.

In particular, the console unit of the aforementioned type can be incorporated in a disk array unit or apparatus, for example. The enclosure of the disk array apparatus is in general designed to define the inner space extending from an opening toward the connection board. Storage device units may be incorporated within the space, so that the storage device units are connected to the connection board. The storage device units may be arranged in parallel with one another. The storage device units may be hard disk drive (HDD) units, for example. The console unit of the aforementioned type greatly contributes to reduction in size of the disk array apparatus.

According to a second aspect of the present invention, there is provided an operation button unit comprising: a plate member; an operation button spaced from the surface of the plate member; a thrust member connected to the operation button, the thrust member penetrating through a bore defined in the plate member; and an elastic transformable member continuous with the plate member and the operation button based on integral formation.

The operation button unit enables a reduced thickness of the elastic transformable member between the operation button and the plate member since the plate member and the operation button are continuous based on integral formation. An operation button unit conventionally includes operation buttons utilizing the elasticity of coil springs. The operation button unit of this type requires a coil spring of a sufficient length to establish a sufficient elasticity of the coil spring. It is thus difficult to achieve reduction in the thickness of the conventional operation button unit.

According to a third aspect of the present invention, there is provided an operation button assembly comprising: a housing; a plate member spaced from the inner surface of the housing by a predetermined distance; an operation button spaced from the surface of the plate member and received in an opening defined in the housing; a thrust member connected to the operation button, the thrust member penetrating through a bore defined in the plate member; an elastic transformable member continuous with the plate member and the operation button based on integral formation; a backing member contacting the back surface of the plate member so as to hold the plate member against the housing; and a through hole defined in the backing member and receiving the thrust member.

When an urging force is applied to the operation button, the operation button along with the thrust member retreats in response to the elastic deformation of the elastic transformable member. The thrust member is allowed to realize the action of switching in this manner. When the urging force is released from the operation button, the elastic transformable member reverts to the original shape based on its own elasticity. The operation button along with the thrust member advances. The operation button is thus prepared for a subsequent action of switching. The rear end of the thrust member may be received on a push switch or button or the like.

The operation button assembly may further include a protrusion integrally formed on the surface of the plate member so as to protrude from the surface of the plate member. The protrusion serves to ensure a predetermined space between the housing and the plate member. A sufficient space can be ensured for the elastic deformation of the elastic transformable member. The elastic transformable member is allowed to reliably deform in a space between the housing and the plate member.

The backing member may detachably be attached to the housing. In this case, the backing member and the operation button unit, including the plate member, the operation button, thrust member and the elastic transformable member, can be detached from the housing in a facilitated manner. The backing member and the operation button unit can thus be separated in an easier manner.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
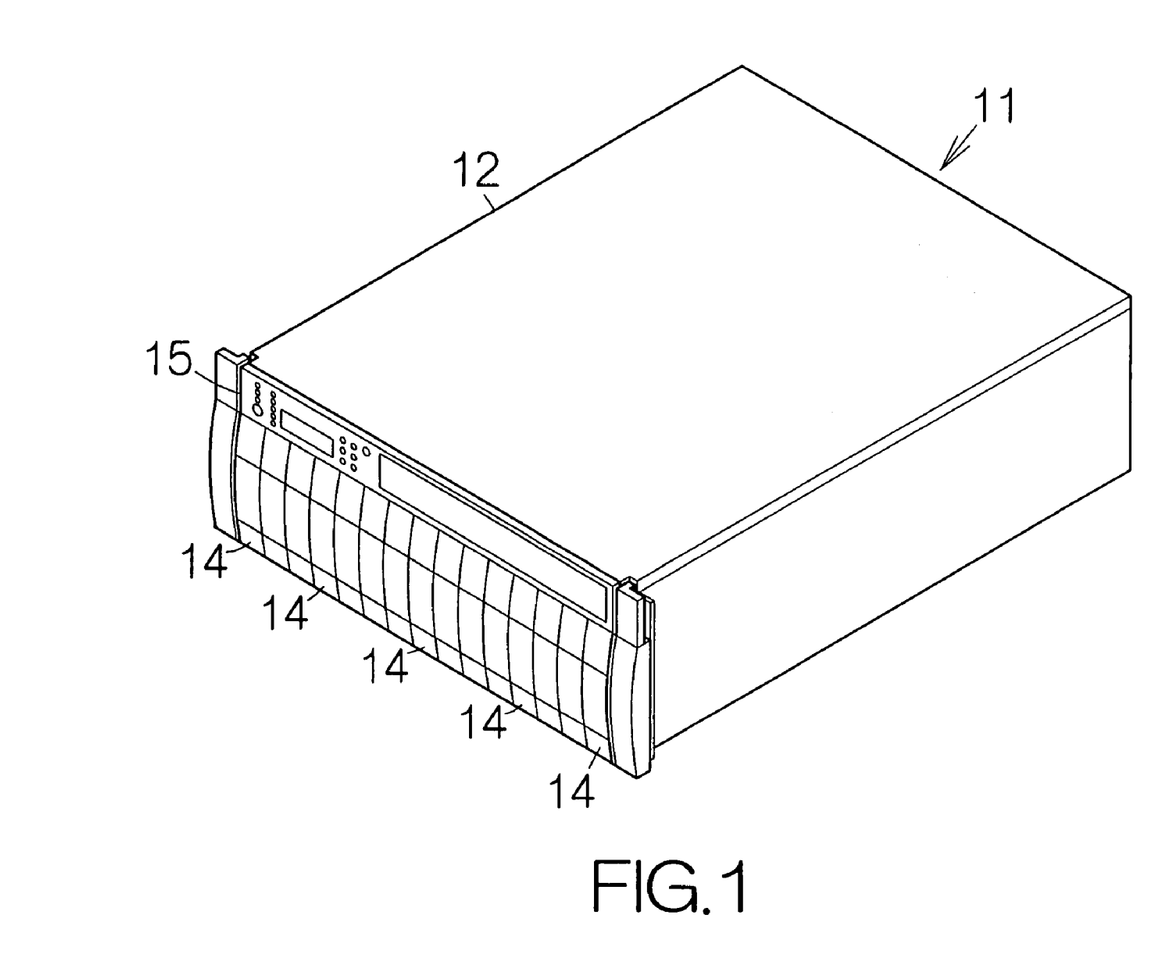
FIG. 1 is a perspective view schematically illustrating the externals of a disk array apparatus as a specific example of an electronic apparatus according to an embodiment of the present invention.

FIG. 1 schematically illustrates the externals of a disk array unit or apparatus 11 as an example of an electronic apparatus according to an embodiment of the present invention. The disk array apparatus 11 includes an enclosure 12 of a flat parallelepiped, for example. The enclosure 12 is designed to extend rearward from the front opening. Storage device units or hard disk drive (HDD) units 14 are inserted into the front opening. The HDD units 14 are arranged in parallel with one another. The HDD units 14 are kept in a specific attitude. A front cover 15 is coupled to the front opening of the enclosure 12 at a position upwardly adjacent the HDD units 14.

The disk array apparatus 11 is constructed as a so-called rack mount type. In other words, the disk array apparatus 11 can be mounted into a rack, for example. When the disk array apparatus 11 is set in the rack, the individual HDD units 14 are kept in an upright attitude. In this situation, the magnetic recording disk or disks rotate around the horizontal rotation axis within the HDD. The disk array apparatus 11 may be connected to a server computer likewise mounted in the rack, for example. The disk array apparatus 11 may operate in response to instructions supplied from the server computer.

Figure 2:
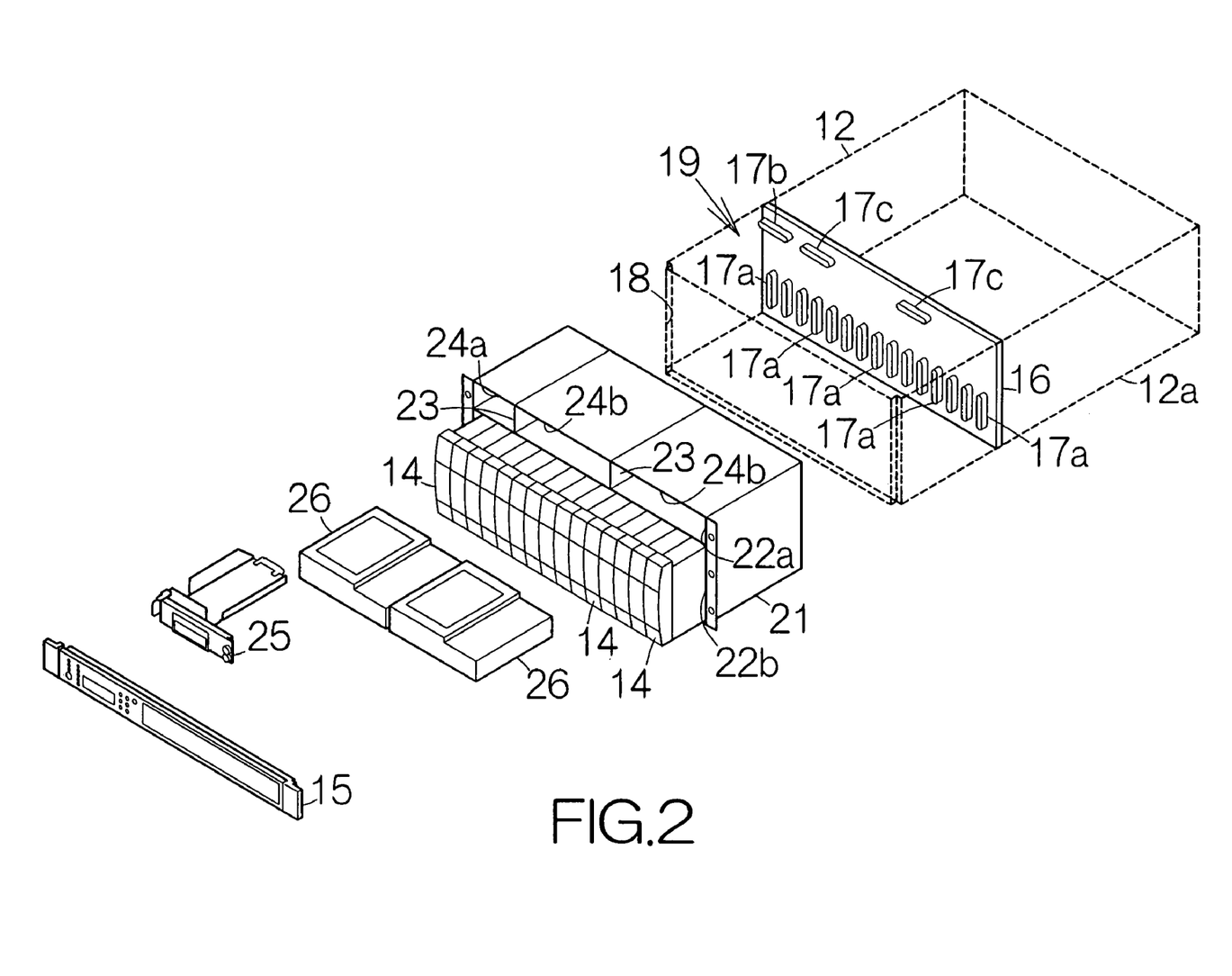
FIG. 2 is an exploded view schematically illustrating the structure of the disk array apparatus.

As shown in FIG. 2, a back panel 16 is located in the enclosure 12. The back panel 16 serves as a connection board of the invention. The back panel 16 is kept in an attitude upright to the bottom plate 12a of the enclosure 12. The bottom plate 12a extends along the horizontal plane. Connectors 17a, 17b, 17c are mounted on the front surface of the upright back panel 16. A front space 19 is defined within the enclosure 12 in front of the back panel 16. The front space 19 opens at the front opening 18 formed in the enclosure 12.

A front unit cage 21 is contained within the front space 19. Upper and lower inner spaces 22a, 22b are defined in the front unit cage 21. Two upright walls 23, 23 are located in the upper inner space 22a so as to divide the upper inner space 22a into first, second and third partitioned rooms 24a, 24b, 24b. The lower inner space 22b is designed to receive the aforementioned HDD units 14. When the individual HDD unit 14 is fully inserted into the front unit cage 21 through the front opening 18, a connector at the back of the HDD unit 14 is received at the corresponding connector 17a on the back panel 16. The HDD unit 14 is thus electrically connected to the back panel 16.

A console unit 25 is contained in the first partitioned room 24a. The console unit 25 is inserted into the first partitioned room 24a through the front opening 18 of the enclosure 12. When the console unit 25 is fully inserted into the front unit cage 21, a connector at the back end of the console unit 25 is received at the corresponding connector 17b on the back panel 16. The console unit 25 is thus electrically connected to the back panel 16.

Battery units 26, 26 are received in the second and third partitioned rooms 24b, 24b, respectively. The individual battery units 26 are inserted into the second and third partitioned rooms 24b, 24b, respectively, through the front opening 18 of the enclosure 12. When the battery unit 26 is fully inserted into the front unit cage 21, a connector at the back end of the battery unit 25 is received at the corresponding connector 17c on the back panel 16. The battery unit 26 is thus electrically connected to the back panel 16. The battery units 26, 26 may have the identical structure.

The aforementioned front cover 15 is coupled to the front unit cage 21. The front cover 15 closes the opening of the upper inner space 22a. The front cover 15 is designed to cover over the front surfaces of the console unit 25 and battery units 26, 26 received in the front unit cage 21.

Figure 3:
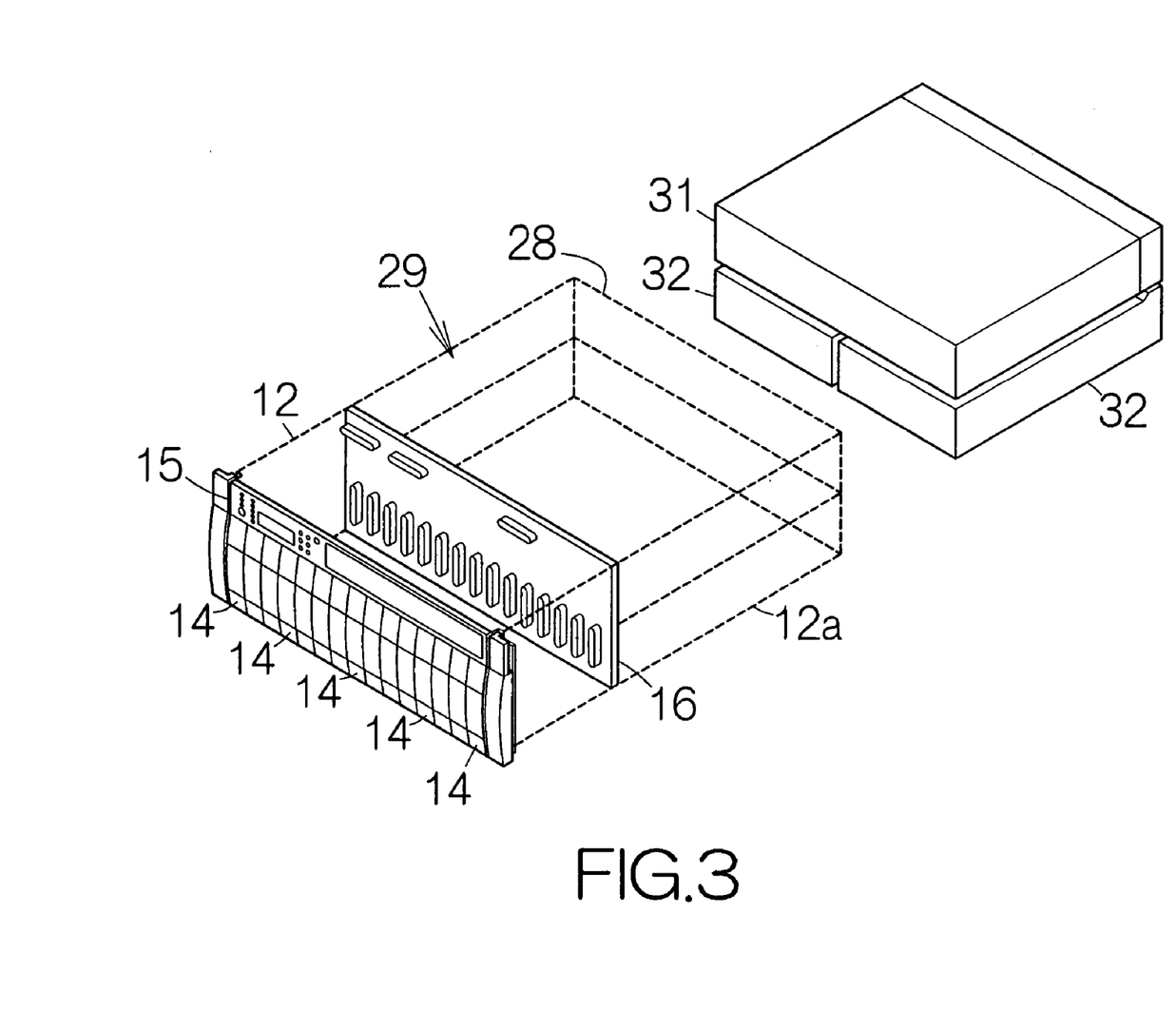
FIG. 3 is an exploded view schematically illustrating the structure of the disk array apparatus.

As show in FIG. 3, a rear space 29 is defined within the enclosure 12 at the back of the back panel 16. The rear space 29 opens at a rear opening 28 formed in the enclosure 12. A controller unit 31 is received in the upper section of the rear space 29. A pair of power source unit 32, 32 is received in the lower section of the rear space 29. The controller unit 31 and the power source units 32 are inserted into the enclosure 12 through the rear opening 28. When the controller unit 31 and the power source units 32, 32 are fully inserted into the enclosure 12, connectors at the back ends of the controller unit 31 and the power source units 32, 32 are received at the corresponding connectors, not shown, on the back surface of the back panel 16. The controller unit 31 and the power source units 32, 32 are thus electrically connected to the back panel 16. The controller unit 31 may be connected to the aforementioned server computer, for example. The power source units 32, 32 may have the identical structure.

The controller unit 31 is designed to receive instruction signals for writing and reading from an upper host such as the server computer. The controller 31 controls the write and read operation of the individual HDD units 14 in response to the instruction signals. The controller unit 31 and the HDD units 14 are allowed to receive electric power from the power source units 32. The power source units 32 serve to convert the alternating current to the direct current. Even if one of the power source units 32 suffers from a failure, the other of the power source units 32 allows the disk array apparatus 11 to keep operating. In this case, the disk array apparatus 11 keeps operating during replacement of the power source unit 32. In other words, the power source unit 32 out of operation can be exchanged with new one during the continuous operation of the disk array apparatus 11.

Assume that the supply of electric power from the power source units 32, 32 is terminated due to power cut, for example. Even in this case, the controller unit 31 and the HDD units 14 are allowed to receive electric power from the battery units 26. The battery units 26 are designed to store electric power supplied from the power source units 26. Moreover, two battery units 26 are assembled in the disk array apparatus 11. Accordingly, even if one of the battery units 26 suffers from a failure, the other of the battery units 26 still enables the disk array apparatus 11 to keep operating. The disk array apparatus 11 keeps operating during replacement of the battery unit 26.

Figure 4:
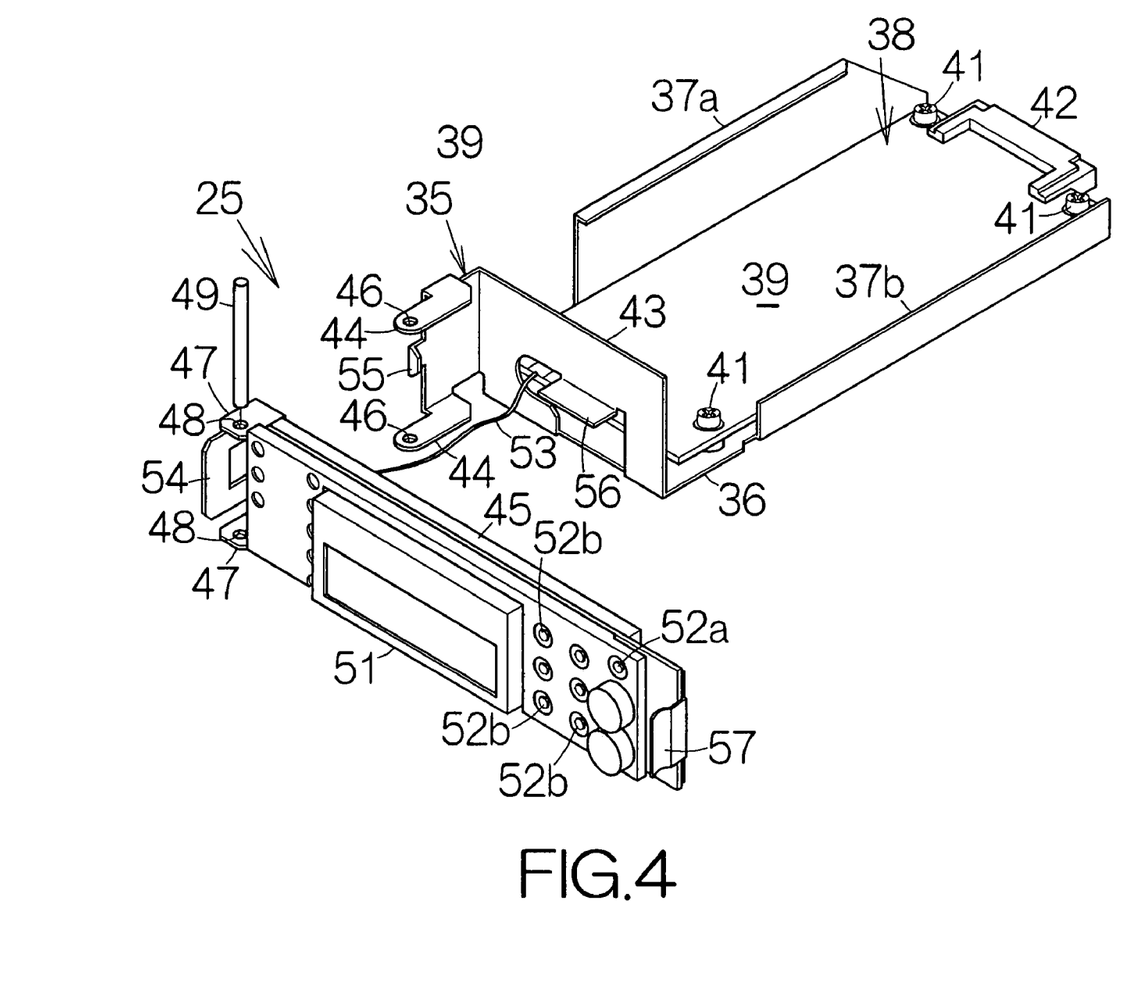
FIG. 4 is an enlarged exploded view schematically illustrating the structure of a console unit.

Next, a detailed description will be made on the structure of the console unit 25. As shown in FIG. 4, the console unit 25 includes a housing 35 serving as a support member. The housing 35 includes a rectangular housing body 36 extending rearward in the longitudinal direction from the front end along a horizontal virtual plane. Guide walls 37a, 37b are formed at the opposite sides of the housing body 36. The individual guide walls 37a, 37b extend in the longitudinal direction. When the console unit 25 is inserted into the first partitioned room 24a of the front unit cage 21 as described above, the housing body 36 as well as the guide walls 37a, 37b are guided along the inside wall surface of the first partitioned room 24a. The guide walls 37a, 37b maybe continuous to the housing body 36 based on integral formation.

A printed circuit board unit 38 is located on the housing body 36 between the guide walls 37a, 37b. The printed circuit board unit 38 includes a substrate 39 extending rearward in the longitudinal direction from the front end along a horizontal virtual plane in the same manner as the housing body 36. The substrate 39 may be kept in an attitude parallel to the housing body 36. A predetermined space maybe defined between the printed circuit board unit 38 and the housing body 36. Screws 41 may be used to fix the substrate 39 to the housing body 36, for example. The substrate 39 is in this manner received on the housing body 36.

Various electronic components are mounted on the substrate 39. The mounted electronic components serve to establish a certain controller circuit on the printed circuit board unit 38. A connector 42 is attached to the rear end of the substrate 39. The connector 42 may be mounted on the substrate 39. When the console unit 25 is fully inserted into the first partitioned room 24a of the front unit cage 21 as described above, the connector 42 is coupled to the corresponding connector 17b on the back panel 16. The controller circuit on the printed circuit board unit 38 is thus electrically connected to the aforementioned controller unit 31.

A support wall 43 is positioned at the front end of the housing body 36. The support wall 43 is designed to stand upright from the housing body 36. Upper and lower support arms 44, 44 are attached to the support body 43. The support arms 44, 44 extend in a horizontal direction in parallel with each other. A console 45 is coupled to the support arms 44, 44 for relative rotation. When the console unit 25 is fully inserted into the front cage unit 21, the housing body 36 and the guide walls 37a, 37b serve to enable the support wall 43 or the console 45 to be positioned relative to the enclosure 12. The support wall 43 may be physically connected to the enclosure 12 and/or the front unit cage 21. The support wall 43 as well as the support arms 44 may be continuous to the housing body 36 based on integral formation. Here, press machining may be employed to punch out the housing body 36, the guide walls 37a, 37b, the support wall 43 and the support arms 44 from a single plate material, for example.

Through holes 46, 46 are defined in the support arms 44, 44, respectively. The through holes 46, 46 are aligned with a common vertical axis. On the other hand, upper and lower attachment arms 47, 47 are fixed to the console 45. Through holes 48, 48 are likewise defined in the attachment arms 47, 47, respectively. The through holes 48, 48 are aligned with a common vertical axis. The attachment arms 47, 47 are superposed on the support arms 44, 44. A shaft 49 is inserted through the through holes 46, 48. The console 45 is in this manner coupled to the housing 35 for relative rotation around the vertical axis.

Components such as a liquid crystal display (LCD) unit 51 and various operation switches 52a, 52b are incorporated in the console 45, for example. Operation switch may include functional switches 52b in addition to a power switch 52a. An electric wire 53 serves to establish electric connection between the console 45 and the printed circuit board unit 38. The controller circuit on the substrate 39 may operate to display text images on the screen of the LCD unit 51. The controller circuit on the substrate 39 are allowed to supply control signals to the controller unit 31 in response to the manipulation of the operation switches 52a, 52b. The console 45 may include a circuit board and front and back covers sandwiching the circuit board, for example. The LCD unit 51 as well as the operation switches 52a, 52bmay be mounted on the circuit board, for example.

Figure 5:
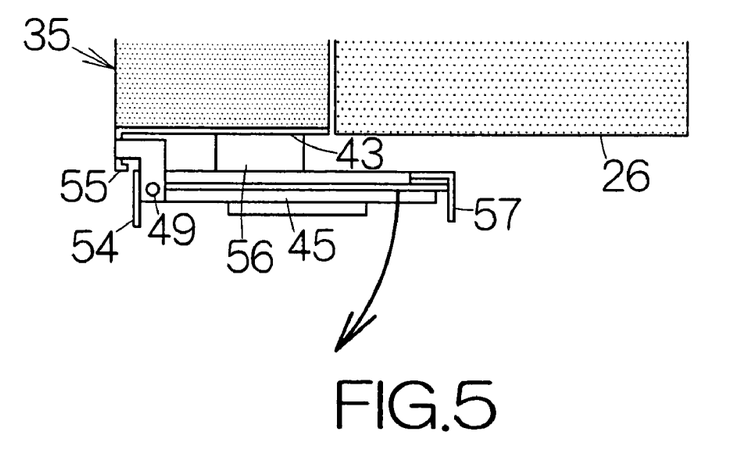
FIG. 5 is a plan view schematically illustrating the relationship between the console unit and the battery unit.

Referring also to FIG. 5, the console 45 covers over not only the housing 35 received in the first partitioned room 24a but also a part of the battery unit 26 received in the second partitioned room 24b adjacent the first partitioned room 24a. The console 45 is allowed to occupy a larger space irrespective of a reduced size of the housing 35. More specifically, the console 45 is allowed to have a larger width in the horizontal direction as compared with the case where a console simply covers over only the housing 35. The visibility of the LCD unit 51 cannot be degraded. A wide discretion can be ensured to position the operation switches 52a, 52b. In addition, a reduced size of the housing 35 contributes to an increased space for the battery unit or units 26. The battery unit or units 26 may have a larger capacity.

Figure 6:
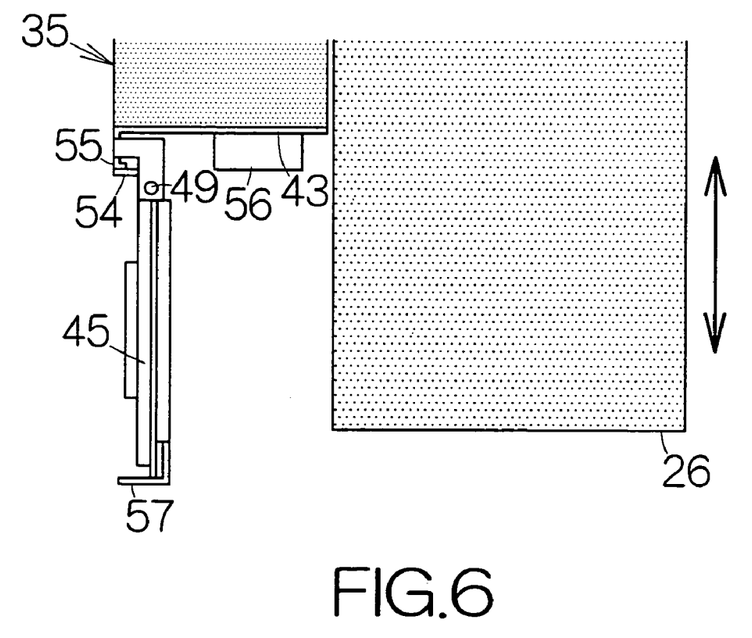
FIG. 6 is a plan view schematically illustrating the relationship between the console unit and the battery unit.

The disk array apparatus 11 is required to always keep operating without any interruption. In this situation, the console unit 25 including the operation switches 52a, 52b cannot be detached at all. Connection must be maintained between the connectors 42, 17b. On the other hand, it is preferable to enable replacement of the battery unit or units 26 irrespective of the continuous operation of the disk array apparatus 11. For example, the console 45 is allowed to rotate about the shaft 49 to reach a retreat position away from the battery unit 26, as shown in FIG. 6. When the console 45 has reached the retreat position, it is possible to reliably avoid interference between the battery unit 26 and the console 45 during attachment or detachment of the battery unit 26. It is unnecessary to remove the console unit 25 out of the first partitioned room 24a when replacement of the battery unit 26 is needed. Electric connection can always be maintained between the console unit 25 and the back panel 16.

The support wall 43 may serve to restrain the rotation of the console 45 around the shaft 49. More specifically, the support wall 43 may contact the console 45 so as to establish the retreat position. In this case, a contact piece 54 may be attached to the console 45, for example. The contact piece 54 rotates around the shaft 49 in synchronization with the rotation of the console 45. A restriction piece 55 is integrally formed on the support wall 43. When the console 45 has reached the retreat position, the contact piece 54 on the console 45 collides against the restriction piece 55 on the support wall 43. As is apparent from FIG. 5, a restriction member 56 may be used to restrain the movement of the console 45 when the console 45 returns from the retreat position. The restriction member 56 may be integral to the support wall 43. Otherwise, a grip 57 may be formed on the console 45. The grip 57 may be used to rotate the console 45.

Figure 7:
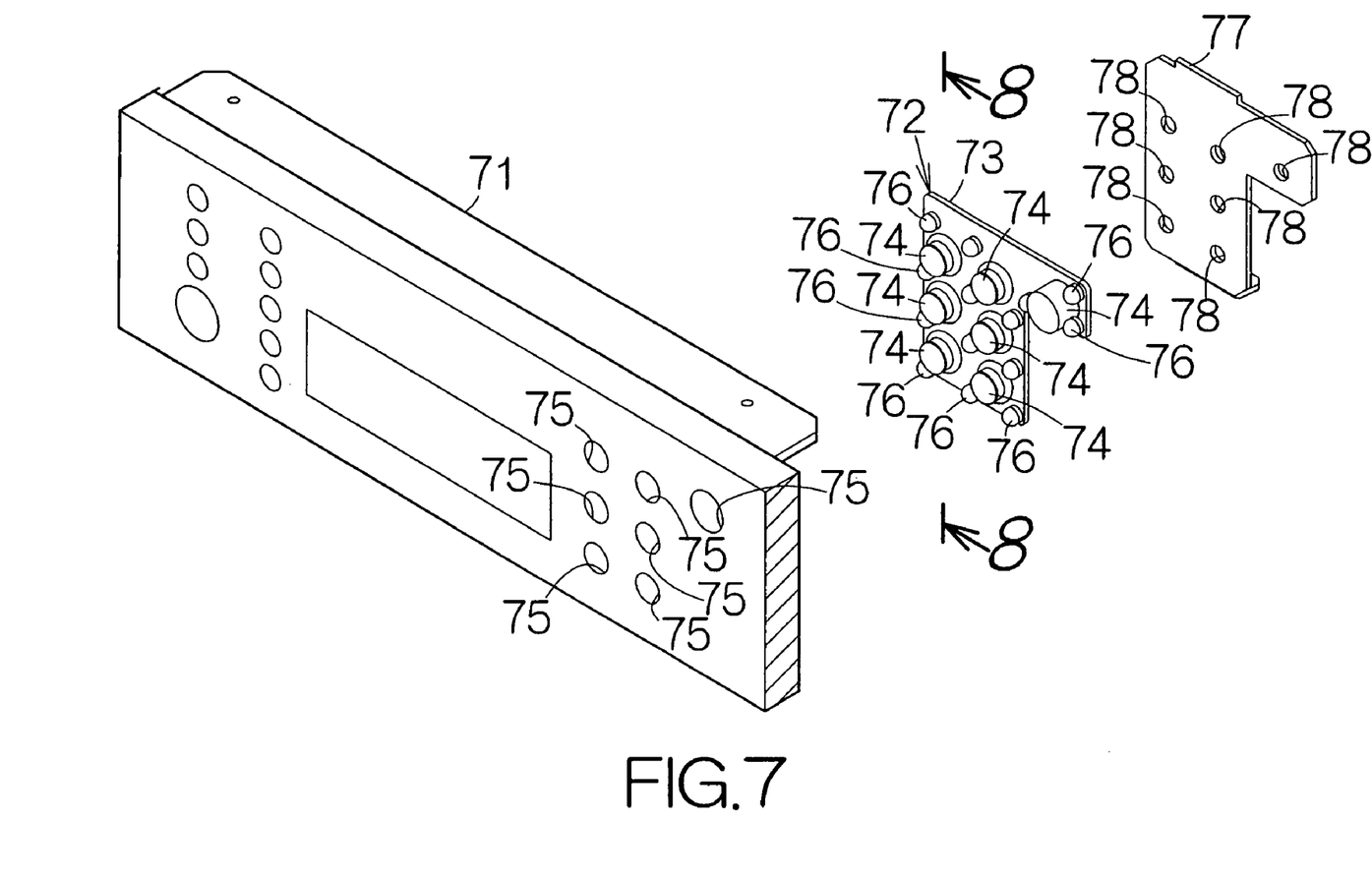
FIG. 7 is an enlarged exploded view schematically illustrating the structure of a front cover.

Next, a detailed description will be made on the structure of the front cover 15. As shown in FIG. 7, an operation button unit 72 is attached to a housing 71 of the front cover 15. The operation button unit 72 includes a plate member 73. The plate member 72 defines a front surface opposed to the inside surface of the housing 71. Operation buttons 74 are positioned on the front surface of the plate member 73. The operation buttons 74 may be arranged in a predetermined matrix. The individual operation buttons 74 are received in corresponding openings 75 defined in the housing 71 as described later in detail.

Protrusions 76 are positioned on the front surface of the plate member 73. The protrusions 76 are designed to protrude from the front surface of the plate member 73 at locations between the operation buttons 74. When the operation buttons 74 are received in the openings 75, the tip ends of the protrusions 76 are urged against the inside surface of the housing 71. The protrusions 76 serve to keep a predetermined distance between the plate member 73 and the inside surface of the housing 71. The operation button unit 72 is made of a resin material such as silicone based on integral formation, for example. A predetermined elasticity is established in the overall operation button unit 72.

A backing member 77 is positioned behind the plate member 73. The backing member 77 is designed to urge the operation button unit 72 against the housing 71. The backing member 77 contacts the back surface of the plate member 73 as described later in detail. The backing member 77 serves to hold the operation button unit 72 within the housing 71. The front cover 15 thus serves as an operation button assembly of the invention. The backing member 77 may be made of a metallic material such as stainless steel, for example. Through holes 78 are formed in the backing member 77. The position of the through holes 78 reflects the arrangement of the operation buttons 74.

Figure 8:
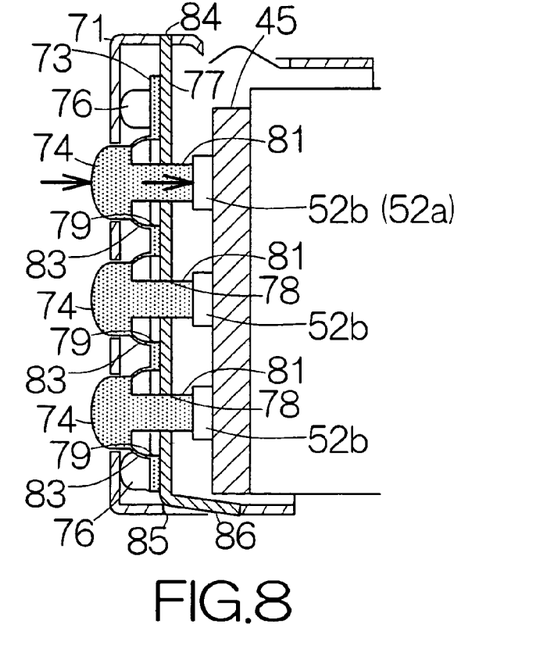
FIG. 8 is an enlarged sectional view taken along the line 8—8 in FIG. 7.

As is apparent from FIG. 8, the operation buttons 74 are spaced forward from the front surface of the plate member 73. Bores 79 are defined in the plate member 73 behind the operation buttons 74. A thrust member or stem 81 is connected to the individual operation button 74. The stem 81 is designed to extend rearward from the operation button 74. The stem 81 penetrates through the corresponding bore 79. The stem 81 extends rearward beyond the back surface of the plate member 73. At the same time, the stem 81 is received in the through hole 78 defined in the backing member 77. The stem 81 penetrates through the backing member 77 to reach beyond the backing member 77.

Elastic transformable members 83 are disposed between the individual operation buttons 74 and the plate member 73. The individual elastic transformable member 83 is continuous from the outer periphery of the operation button 74 to the edge of the bore 79. The continuity may be established based on integral formation of the elastic transformable members 83, the operation buttons 74 and the plate member 73. The elastic deformation of the elastic transformable member 83 induces the longitudinal movement of the stem 81. The elastic transformable member 83 may be shaped in a column, a cone, a dome, or any other similar contours.

The backing member 77 is fixed into the housing 71. A first elongated window 84 is defined in the housing 71. The first elongated window 84 is designed to receive the outer periphery of the backing plate 77. A second elongated window 85 is defined in the housing 71 at a position opposed to the first elongated window 84. An engagement piece 86 is received in the second elongated window 85. The engagement piece 86 is designed to stand rearward from the back surface of the backing plate 77. When the engagement piece 86 reverts to the original shape based on the elasticity, the tip end of the engagement piece 86 engages with the edge of the second elongated window 85. The backing member 77 is fixed to the housing 71 in this manner.

As shown in FIG. 8, when the front cover 15 is coupled to the enclosure 12 after assembling of the aforementioned console unit 25, the stems 81 of the operation buttons 74 are received on the operation switches 52a, 52b on the console 45. The urging force on the operation button 74 induces a backward movement of the operation button 74 and the stem 81 in response to the elastic deformation of the elastic transformable member 83. The stem 81 pushes the operation button 52a, 52b. Since the protrusions 76 keep a space between the housing 71 and the plate member 73, a sufficient space can be ensured for the elastic deformation of the elastic transformable member 83. The elastic transformable member 83 is allowed to reliably deform in a space between the housing 71 and the plate member 73. When the urging force is released from the operation button 74, the elastic transformable member 83 reverts to the original shape based on its own elasticity. The operation button 74 along with the stem 81 advances. The operation button 52a, 52b is prepared for a subsequent manipulation in this manner.

Employment of the operation button unit 72 enables a reduced thickness of the operation button assembly. A reduced thickness of the operation button assembly, namely of the front cover 15, serves to ensure a larger space for the battery units 26. A conventional operation button assembly includes operation buttons utilizing the elasticity of coil springs for acting on the operation switches 52a, 52b. The operation buttons of this type require a stem of a sufficient length to establish a sufficient elasticity of the coil spring. It is difficult to achieve reduction in the thickness of the conventional operation button assembly.

Figure 9:
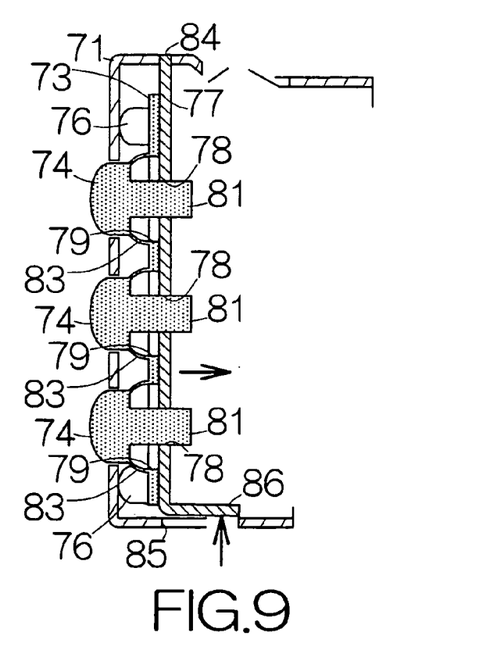
FIG. 9 is an enlarged sectional view, corresponding to FIG. 8, illustrating the detachment of a backing member and a operation button unit from a housing.

As shown in FIG. 9, when a compulsive force is applied to the engagement piece 86, the tip end of the engagement piece 86 is allowed to get out of the second elongated window 85 in the housing 71. The backing member 77 and the operation button unit 72 can be detached from the housing 71 in a facilitated manner. The backing member 77 and the operation button unit 72 can thus be separated in an easier manner.

What is claimed is:

1. A console unit, comprising:
    a support member extending from a front end to a rear end of the console unit and defining a surface receiving and supporting a substrate thereon; and
    a console rotatably connected to the front end of the support member for rotation relative to the support member about a rotation axis transverse to a plane parallel to the surface which receives and supports the substrate, the console being electrically connected to a conductive element on the substrate.

2. The console unit according to claim 1, wherein a connector is attached to the rear end of the support member, the connector protruding rearwardly from the rear end of the support member.

3. The console unit according to claim 2, wherein the connector is mounted on the substrate.

4. An electronic apparatus, comprising:
    an enclosure;
    a substrate extending disposed within the enclosure;
    a support member from a front end to a rear end of the enclosure, the front end being connected to the enclosure, and the support member defining a surface receiving the substrate; and
    a console rotatably connected to the front end of the support member for rotation relative to the support member about a rotation axis transverse to a plane parallel to the surface of the support member, the console being electrically connected to a conductive element on the substrate.

5. The electronic apparatus according to claim 4, further comprising:
    a connection board disposed in the enclosure so that to stand on an internal surface of the enclosure;
    a first connector located on the connection board; and
    a second connector located on the substrate for connection to the first connector.

6. The electronic apparatus according to claim 5, wherein the enclosure defines an inner space extending from an opening formed in the enclosure toward the connection board.

7. The electronic apparatus according to claim 6, wherein storage device units are incorporated within the space, the storage device units being connected to the connection board and arranged in parallel with one another.

8. An operation button unit, comprising:
    a plate member;
    an operation button spaced from a surface of the plate member;
    a thrust member connected to the operation button, the thrust member penetrating through a bore defined in the plate member; and
    an elastic transformable member continuous with the plate member and the operation button based on integral formation.

9. The operation button unit according to claim 8, further comprising a protrusion protruding from the surface of the plate member.

10. An operation button assembly, comprising:
    a housing;
    a plate member spaced from an inner surface of the housing by a predetermined distance;
    an operation button spaced from a surface of the plate member and received in an opening defined in the housing;
    a thrust member connected to the operation button, the thrust member penetrating through a bore defined in the plate member;
    an elastic transformable member continuous with the plate member and the operation button based on integral formation;
    a backing member contacting a back surface of the plate member so as to hold the plate member against the housing; and
    a through hole defined in the backing member and receiving the thrust member.

11. The operation button assembly according to claim 10, wherein the backing member is detachably attached to the housing.

12. The operation button assembly according to claim 10, wherein a protrusion is integrally formed on the surface of the plate member so as to protrude from the surface of the plate member.

13. The operation button assembly according to claim 12, wherein the backing member is detachably attached to the housing.

14. A console unit, comprising:
    a support member having a generally rectangular body including a support surface extending longitudinally from a front end to a rear end of the console unit;
    a substrate disposed on and supported by the support surface;
    a console member connected to the front end of the support member for rotation relative to the support member around a rotation axis transverse to the support surface; and
    an electrical connector mounted on the substrate at the rear end of the support member, the console being electrically connected to the electrical connector.

15. The console according to claim 14, wherein the electrical connector protrudes rearwardly from the rear end of the support member, parallel to the planar surface of the support surface.

* * * * *